(12) United States Patent
Moore

(10) Patent No.: US 7,378,749 B2
(45) Date of Patent: May 27, 2008

(54) ELECTRICAL GENERATOR SYSTEM

(76) Inventor: Donald O. Moore, 605 W. Annie Dr., Muncie, IN (US) 47303-9647

( * ) Notice: Subject to any disclaimer, the term of this patent is extended or adjusted under 35 U.S.C. 154(b) by 0 days.

(21) Appl. No.: 11/258,705

(22) Filed: Oct. 26, 2005

(65) Prior Publication Data

US 2007/0090649 A1    Apr. 26, 2007

(51) Int. Cl.
- B60L 1/02 (2006.01)
- F01K 15/00 (2006.01)
- F01K 17/02 (2006.01)
- F02C 6/00 (2006.01)
- F02C 6/18 (2006.01)

(52) U.S. Cl. .......................................... 290/2; 310/181
(58) Field of Classification Search ............... 290/2; 310/181
See application file for complete search history.

(56) References Cited

U.S. PATENT DOCUMENTS

| | | | | |
|---|---|---|---|---|
| 1,156,594 A | | 10/1915 | Fiscus | |
| 2,899,565 A | * | 8/1959 | Turner | 290/1 R |
| 3,122,663 A | * | 2/1964 | Kach | 310/11 |
| 3,130,330 A | * | 4/1964 | Kach | 310/11 |
| 3,149,247 A | * | 9/1964 | Cobine et al. | 310/11 |
| 3,182,213 A | * | 5/1965 | Rosa | 310/11 |
| 3,214,615 A | * | 10/1965 | Way | 310/11 |
| 3,215,870 A | * | 11/1965 | Brill | 310/11 |
| 3,215,871 A | * | 11/1965 | Brill | 310/11 |
| 3,219,852 A | * | 11/1965 | Brill | 310/11 |
| 3,233,127 A | * | 2/1966 | McKechnie | 310/11 |
| 3,248,578 A | * | 4/1966 | Brill et al. | 310/11 |
| 3,263,104 A | * | 7/1966 | Brill et al. | 310/11 |
| 3,353,039 A | * | 11/1967 | Dyott | 310/11 |
| 3,356,872 A | * | 12/1967 | Woodson | 310/11 |
| 3,360,666 A | * | 12/1967 | Klein | 310/11 |
| 3,374,369 A | * | 3/1968 | Broom | 310/11 |
| 3,397,330 A | * | 8/1968 | Eiichi et al. | 310/11 |
| 3,449,600 A | * | 6/1969 | Allport et al. | 310/11 |
| 3,480,806 A | * | 11/1969 | Berberich | 310/11 |
| 3,484,859 A | * | 12/1969 | Mottram | 310/11 |
| 3,508,086 A | * | 4/1970 | Allport et al. | 310/11 |
| 3,508,087 A | * | 4/1970 | Graziotti et al. | 310/11 |
| 3,517,229 A | * | 6/1970 | Bidard | 310/11 |
| 3,549,914 A | * | 12/1970 | Conner et al. | 310/11 |
| 3,553,502 A | * | 1/1971 | Kasahara et al. | 310/11 |
| 3,578,998 A | * | 5/1971 | Euerle | 310/11 |
| 3,660,700 A | * | 5/1972 | Aisenberg et al. | 310/11 |
| 3,760,205 A | * | 9/1973 | Imris | 310/168 |
| 3,878,409 A | * | 4/1975 | Gill et al. | 310/11 |
| 4,093,879 A | * | 6/1978 | Marchant et al. | 310/11 |
| 4,155,022 A | | 5/1979 | Crockett | 310/168 |
| 4,276,482 A | * | 6/1981 | Crockett | 290/52 |

(Continued)

Primary Examiner—Darren Schuberg
Assistant Examiner—Pedro J. Cuevas
(74) Attorney, Agent, or Firm—Taylor & Aust, P.C.; Ronald K. Aust

(57) ABSTRACT

An electrical generator system includes a source for producing heated gases, a conduit connected to the source for receiving a flow of the heated gases, and a generator assembly positioned in close proximity to the conduit. The generator assembly includes a plurality of magnets positioned in a spaced relationship, the plurality of magnets producing a magnetic field. At least one electrical conductor is positioned adjacent the plurality of magnets to conduct an electrical current generated in response to the flow of heated gases in the conduit and the magnetic field.

18 Claims, 5 Drawing Sheets

U.S. PATENT DOCUMENTS

| | | | |
|---|---|---|---|
| 4,361,423 A | 11/1982 | Nitz | 55/100 |
| 4,394,582 A | 7/1983 | Kreissl et al. | 290/4 |
| 4,404,482 A * | 9/1983 | Okuo et al. | 310/11 |
| 4,851,722 A * | 7/1989 | Zauderer | 310/11 |
| 5,010,255 A * | 4/1991 | Hilal et al. | 307/106 |
| 5,348,050 A * | 9/1994 | Ashton | 137/827 |
| 5,507,267 A * | 4/1996 | Stuer | 123/537 |
| 5,614,773 A * | 3/1997 | Fabris | 310/11 |
| 5,637,934 A * | 6/1997 | Fabris | 310/11 |
| 6,066,898 A | 5/2000 | Jensen | 290/52 |
| 6,242,834 B1 * | 6/2001 | Akemakou | 310/162 |
| 6,268,673 B1 * | 7/2001 | Shah et al. | 310/90.5 |
| 6,310,406 B1 | 10/2001 | Van Berkel | 260/43 |
| 6,386,187 B1 * | 5/2002 | Phykitt | 123/538 |
| 6,450,283 B1 | 9/2002 | Taggett | 180/304 |
| 6,470,680 B1 | 10/2002 | Janeke | 60/597 |
| 6,484,492 B2 * | 11/2002 | Meholic et al. | 60/247 |
| 6,509,664 B2 * | 1/2003 | Shah et al. | 310/181 |
| 6,751,943 B2 * | 6/2004 | Meholic et al. | 60/204 |
| 6,756,870 B2 * | 6/2004 | Kuwahara | 335/224 |
| 6,758,042 B2 | 7/2004 | Huang | 60/597 |
| 6,763,811 B1 * | 7/2004 | Tamol, Sr. | 123/536 |
| 6,784,585 B2 * | 8/2004 | Shah et al. | 310/181 |
| 6,851,413 B1 * | 2/2005 | Tamol, Sr. | 123/536 |
| 6,854,274 B2 | 2/2005 | Keller | 60/773 |
| 6,952,060 B2 * | 10/2005 | Goldner et al. | 310/12 |
| 2003/0001439 A1 * | 1/2003 | Schur | 310/11 |
| 2003/0001510 A1 * | 1/2003 | Vahab | 315/111.21 |
| 2003/0034697 A1 * | 2/2003 | Goldner et al. | 310/17 |
| 2003/0071524 A1 | 4/2003 | Doi | 310/64 |
| 2003/0101973 A1 | 6/2003 | Hricak | 123/536 |
| 2003/0102759 A1 * | 6/2003 | Shah et al. | 310/181 |
| 2003/0136108 A1 * | 7/2003 | Meholic et al. | 60/204 |
| 2004/0027022 A1 | 2/2004 | Weir | 310/178 |
| 2004/0216722 A1 | 11/2004 | Tamol | 123/536 |
| 2005/0189771 A1 * | 9/2005 | Innocenti et al. | 290/52 |

* cited by examiner

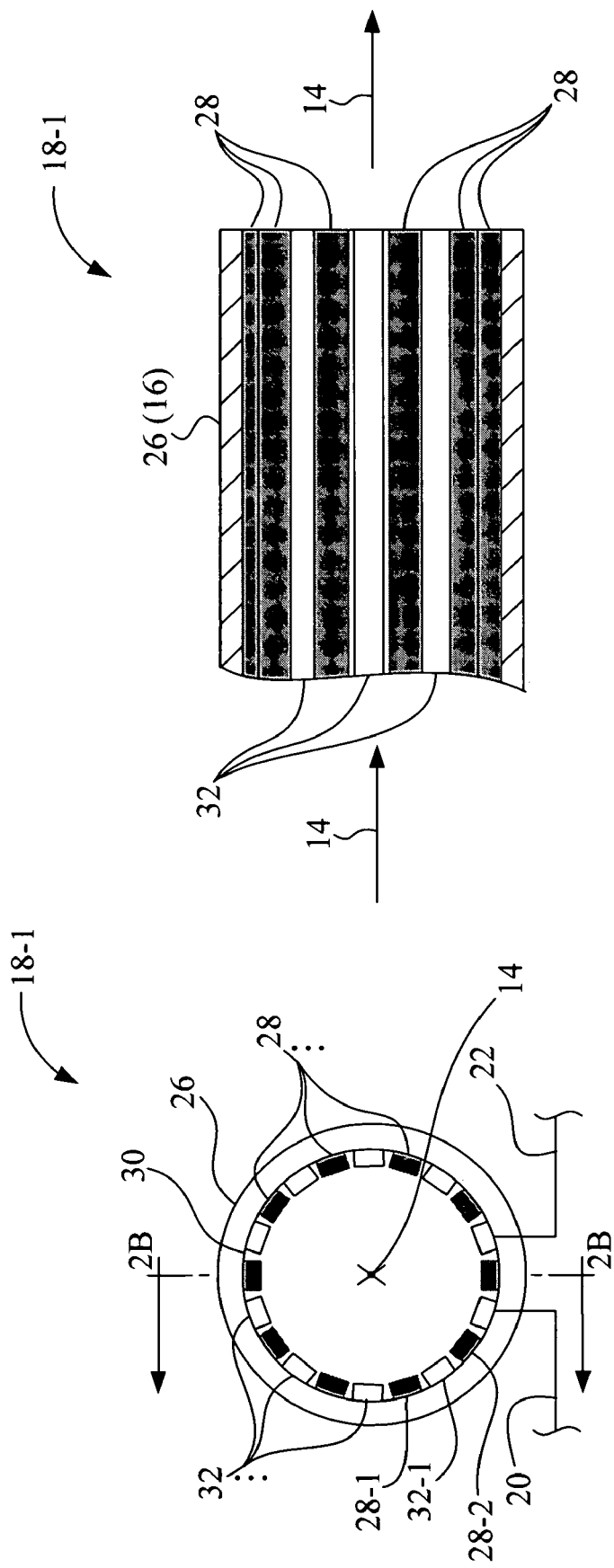

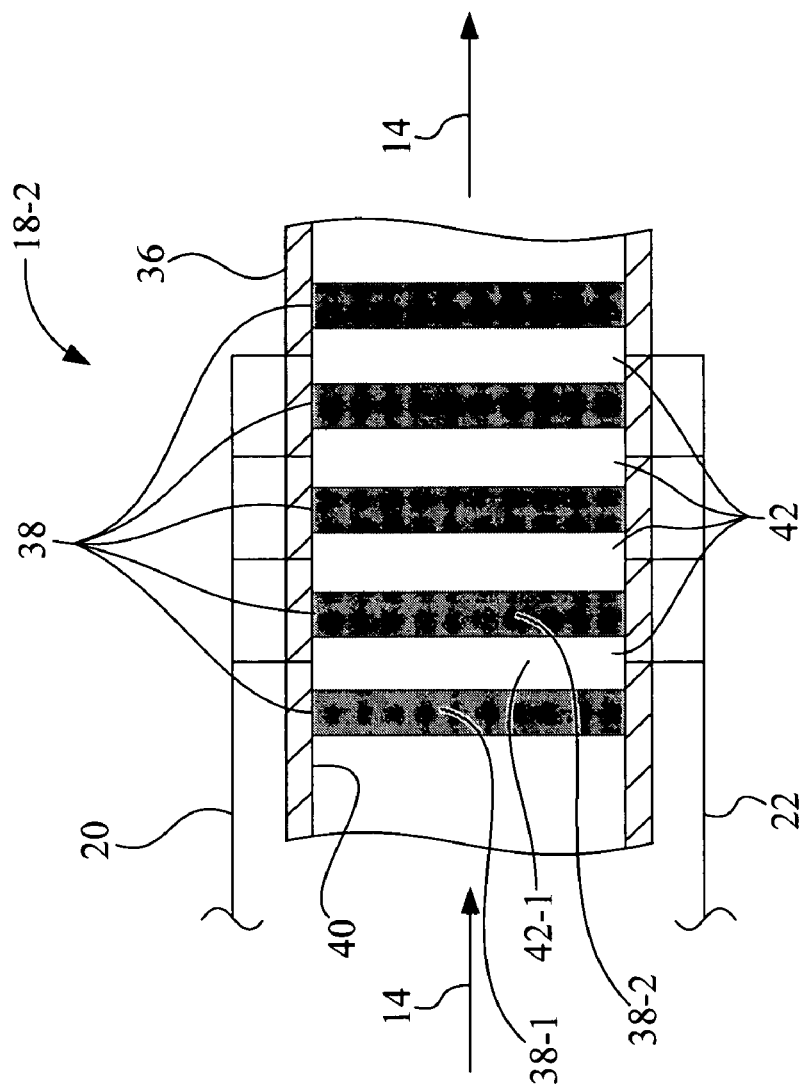
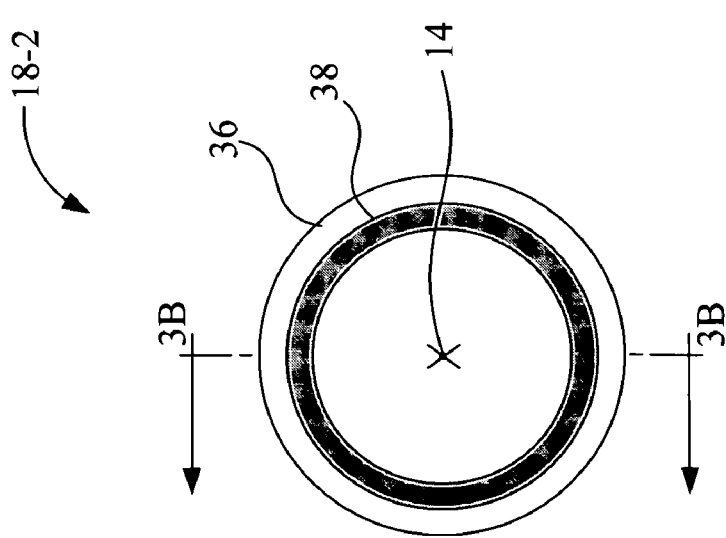
Fig. 3B
Fig. 3A

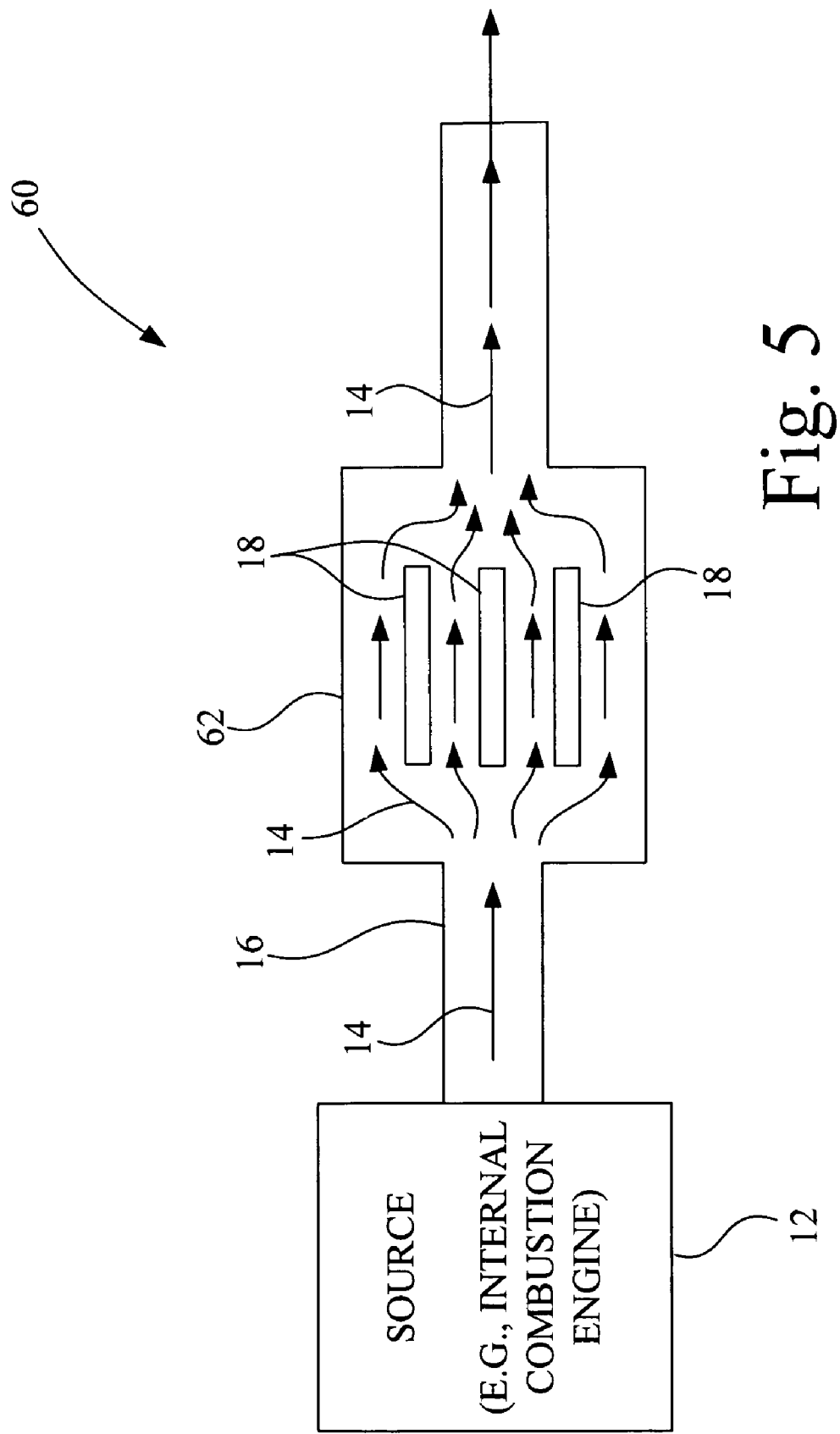

ELECTRICAL GENERATOR SYSTEM

BACKGROUND OF THE INVENTION

1. Field of the Invention

The present invention relates to an electrical generator system, and, more particularly, to a generator assembly used in an electrical generator system.

2. Description of the Related Art

Generator systems have long been used to generate electrical energy. One such generator system utilizes a configuration of magnets and electrical coils that move in relation to each other to generate electricity. In an automobile, for example, an electrical generation device, e.g., an alternator, includes a rotor that is driven by the crankshaft of an internal combustion engine to rotate in relation to a stationary stator. Thus, such as generation system utilizes energy that could otherwise be used in powering the automobile.

SUMMARY OF THE INVENTION

The present invention provides electrical generator system that utilizes a flow of heated gases and its affect on magnetism to generate electrical energy.

The invention, in one form thereof, is directed to an electrical generator system. The electrical generator system includes a source for producing heated gases, a conduit connected to the source for receiving a flow of the heated gases, and a generator assembly positioned in close proximity to the conduit. The generator assembly includes a plurality of magnets positioned in a spaced relationship, the plurality of magnets producing a magnetic field. At least one electrical conductor is positioned adjacent the plurality of magnets to conduct an electrical current generated in response to the flow of heated gases in the conduit and the magnetic field.

The invention, in another form thereof, is directed to a generator assembly. The generator assembly includes a tubular housing configured to be positioned in close proximity to a flow of heated gases. A plurality of magnets is positioned in a spaced relationship along the tubular housing, the plurality of magnets producing a magnetic field. At least one electrical conductor is positioned adjacent the plurality of magnets to conduct an electrical current generated in response to the flow of heated gases and the magnetic field.

One advantage of the present invention is that it may be adapted for use in a variety of motorized vehicles, such as for example, land vehicles, watercraft, and aircraft, e.g., helicopters.

Another advantage of the present invention is that the generator assembly may be formed with no moving parts.

Another advantage of one embodiment of the present invention is the dual use of the generator assembly to both generate electricity and reduce sound, e.g., exhaust noise.

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawings, wherein:

FIG. 2A is an end view of one embodiment of a generator assembly for use in the electrical generator system of FIG. 1.

FIG. 2B is a side sectional view of the generator assembly of FIG. 2A.

FIG. 3A is an end view of another embodiment of a generator assembly for use in the electrical generator system of FIG. 1.

FIG. 3B is a side sectional view of the generator assembly of FIG. 3A.

FIG. 5 is a general diagrammatic representation of an electrical generator system configured in accordance with another embodiment of the present invention.

Corresponding reference characters indicate corresponding parts throughout the several views. The exemplifications set out herein illustrate embodiments of the invention, and such exemplifications are not to be construed as limiting the scope of the invention in any manner.

DETAILED DESCRIPTION OF THE INVENTION

Figure 1:
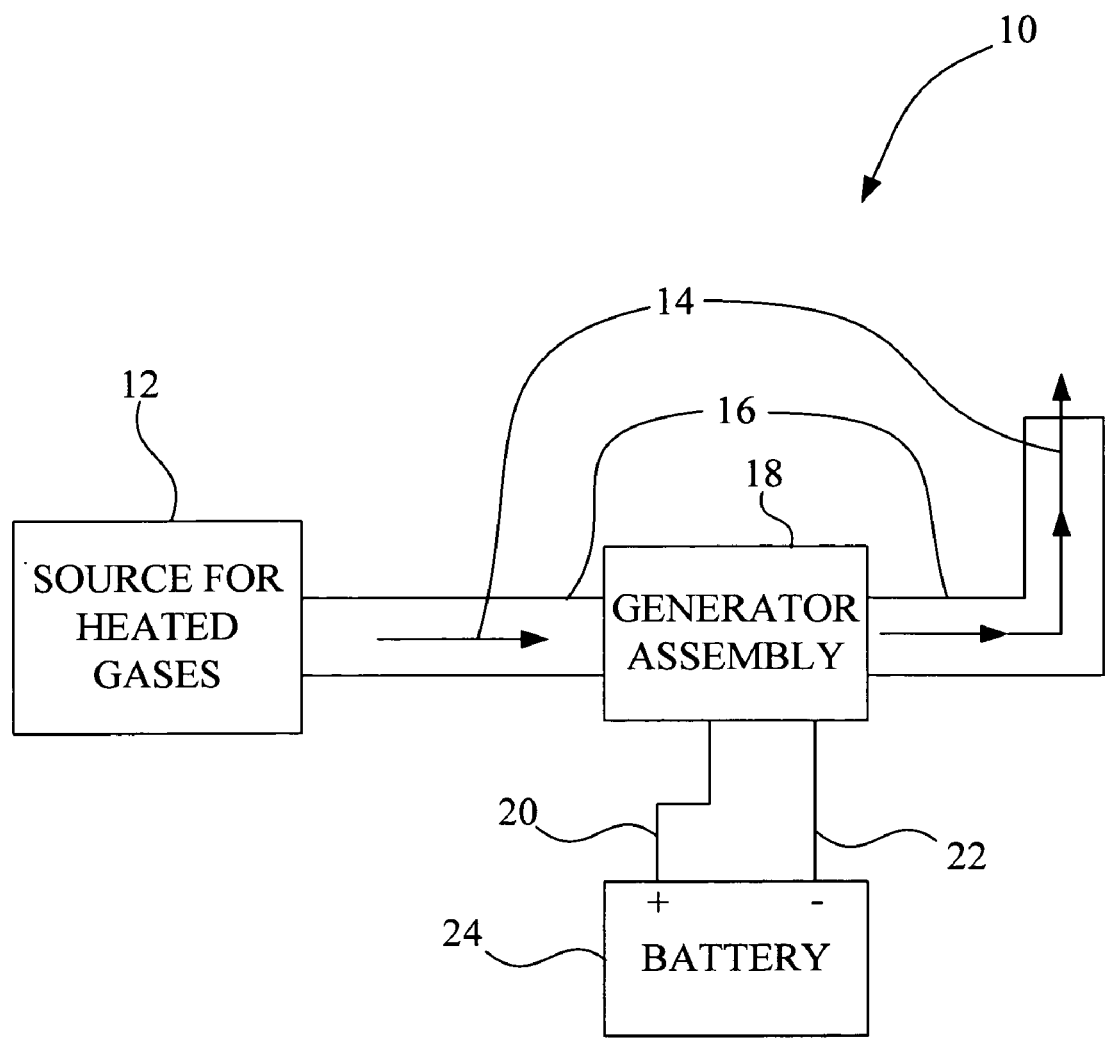
FIG. 1 is a general diagrammatic representation of an electrical generator system configured in accordance with an embodiment of the present invention.

Referring now to the drawings and particularly to FIG. 1, there is shown a general diagrammatic representation of an electrical generator system 10 configured in accordance with an embodiment of the present invention.

Electrical generator system 10 includes a source 12 for producing heated gases 14, a conduit 16, a generator assembly 18, and electrical cables 20 and 22. As shown in FIG. 1, generator assembly 18 may be connected to a battery 24 via electrical cables 20 and 22 to effect the charging thereof.

Conduit 16 is connected to source 12 for receiving a flow of the heated gases 14. Source 12 may be, for example, an internal combustion engine, and the heated gases 14 may be exhaust gases produced by the internal combustion engine. The internal combustion engine may be part of a conventional power system, or may be a portion of a hybrid system that includes both an internal combustion engine and electrical motor propulsion.

Generator assembly 18 is positioned in close proximity to conduit 16. For example, in one embodiment, the flow of heated gases 14 may pass through generator assembly 18, whereas in another embodiment, the flow of heated gases may flow around an exterior of generator assembly 18. Generator assembly 18 may be located in, and used with, a land vehicle such as an automobile, a watercraft such as a boat, or an aircraft such as a helicopter.

FIG. 2A is an end view of one embodiment of generator assembly 18, referred to herein as generator assembly 18-1. FIG. 2B is a side sectional view of generator assembly 18-1.

Generator assembly 18-1 includes a housing 26 in the form of a tubular structure, which may be formed as a part of conduit 16 to transport the flow of heated gases 14. Housing 26, for example, may be formed from a non-conductive material, such as a heat tolerant plastic. In one embodiment, for example, housing 26 may be about 10 to 15 inches long, although those skilled in the art will recognize that housing 26 may be made longer or shorter, based on the application.

A plurality of magnets 28 is positioned in a spaced relationship, and, in the present embodiment, is mounted to a periphery 30, e.g., an interior surface, of housing 26. For example, where housing 26 forms a portion of conduit 16, the plurality of magnets 28 may be positioned in a spaced relationship along an interior or exterior periphery of conduit 16. In the embodiment of FIGS. 2A and 2B, the plurality of magnets 28 are formed as elongated bars, and arranged such that their longitudinal extent is parallel to the direction of the flow of heated gases 14. The plurality of magnets 28 may be formed, for example, from a ceramic material.

The plurality of magnets 28 produce a magnetic field, with each individual magnet of the plurality of magnets 28 contributing to the magnetic field. In the present embodiment, as shown in FIG. 2A, ten individual magnets are shown as an example, although those skilled in the art will recognize that the number of individual magnets by be increased or reduced from the amount shown in the example, as desired, with a corresponding increase or reduction in the amount of electrical energy generated.

Generator assembly 18-1 further includes at least one electrical conductor, and in this example, includes a plurality of electrical conductors 32. The plurality of electrical conductors 32 may be formed from copper plate or wire, and may be insulated if necessary to avoid electrical short circuits. Alternatively, it is contemplated that the electrical conductors may be formed from other conductive materials, such as for example, graphite encased in plastic. Also, the plurality of electrical conductors 32 may be connected in series, or in some embodiments, may be connected in parallel.

Each of the plurality of electrical conductors 32 are positioned adjacent the plurality of magnets 28. For example, the plurality of conductors 32 is alternatingly interposed between adjacent pairs of magnets of the plurality of magnets 28. As a more specific example, at least one electrical conductor 32-1 may be interposed between an adjacent pair of magnets 28-1, 28-2 of the plurality of magnets 28.

Each of the plurality of electrical conductors 32 are positioned adjacent the plurality of magnets 28 to conduct an electrical current generated in response to the flow of heated gases 14 in conduit 16 and the magnetic field produced by the plurality of magnets 28. It is believed that the flow of heated gases 14 interact, e.g., through particle flow and/or heat transfer, with the plurality of magnets to change the strength of the magnetic field produced by the plurality of magnets 28, thereby generating an electrical current flow in the plurality of electrical conductors 32.

FIG. 3A is an end view of another embodiment of generator assembly 18, referred to herein as generator assembly 18-2. FIG. 3B is a side sectional view of generator assembly 18-2.

Generator assembly 18-2 includes a housing 36 in the form of a tubular structure, which may be formed as a part of conduit 16 to transport the flow of heated gases 14. A plurality of magnets 38 is positioned in a spaced relationship, and, in the present embodiment, is mounted to periphery 40, e.g., an interior surface, of housing 36. For example, where housing 36 forms a portion of conduit 16, the plurality of magnets 38 may be positioned in a spaced relationship along an interior or exterior periphery of conduit 16. The plurality of magnets 38 produce a magnetic field, with each individual magnet of the plurality of magnets 38 contributing to the magnetic field. In the embodiment of FIGS. 3A and 3B, the plurality of magnets 38 may be formed as a circular ring, and arranged such that their circumference is in a plane that intersects the direction of the flow of heated gases 14. The plurality of magnets 38 may be formed, for example, from a ceramic material.

Generator assembly 18-2 further includes at least one electrical conductor, and in this example, includes a plurality of electrical conductors 42. The plurality of electrical conductors 42 may be formed from copper plate or wire, and may be insulated if necessary to avoid electrical short circuits. Also, the plurality of electrical conductors 42 may be connected in parallel, or in some embodiments, may be connected in series. Each of the plurality of electrical conductors 42 are positioned adjacent the plurality of magnets 38. For example, the plurality of electrical conductors 42 is alternatingly interposed between adjacent pairs of magnets of the plurality of magnets 38. As a more specific example, at least one electrical conductor 42-1 may be interposed between an adjacent pair of magnets 38-1, 38-2 of the plurality of magnets 38.

Each of the plurality of electrical conductors 42 are positioned adjacent the plurality of magnets 38 to conduct an electrical current generated in response to the flow of heated gases 14 in conduit 16 and the magnetic field produced by the plurality of magnets 38. It is believed that the flow of heated gases 14 interact, e.g., through particle flow and/or heat transfer, with the plurality of magnets to change the strength of the magnetic field produced by the plurality of magnets 38, thereby generating an electrical current flow in the plurality of electrical conductors 42.

Figure 4:
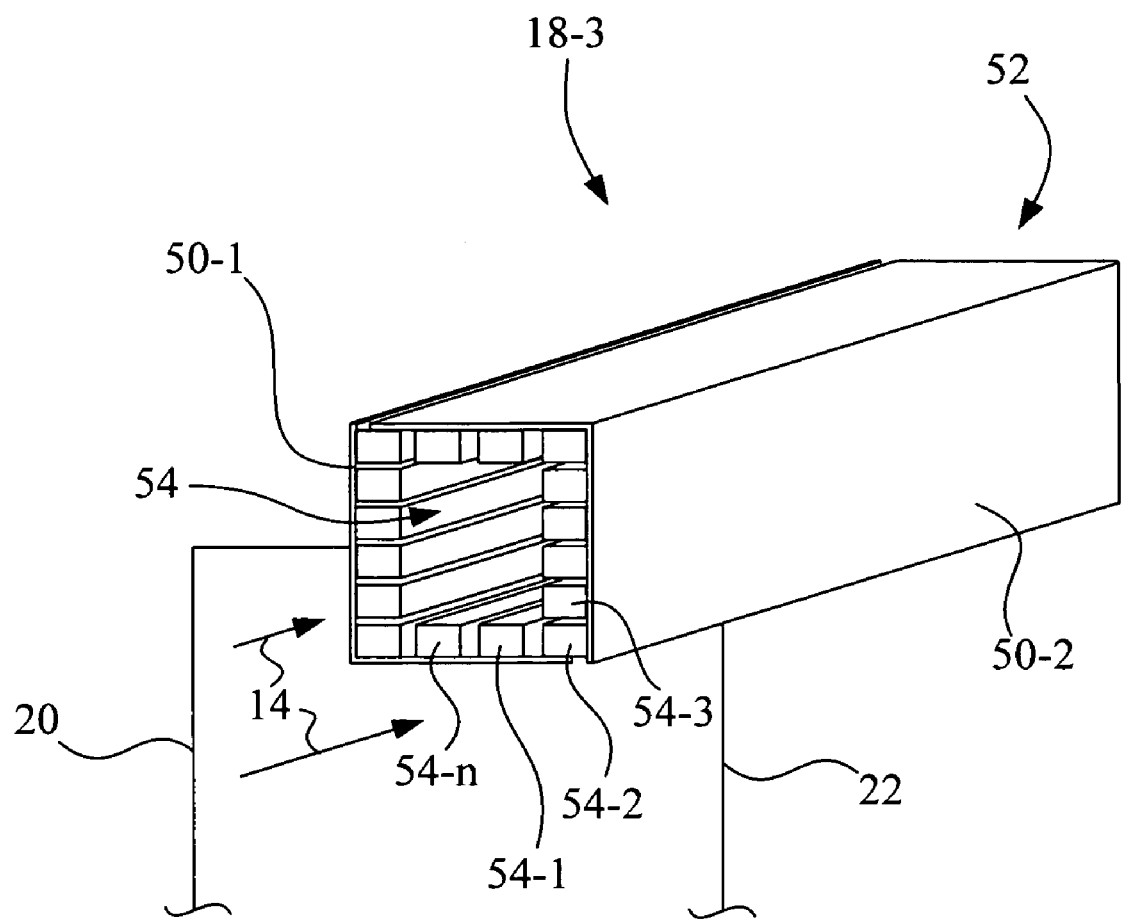
FIG. 4 is a perspective view of another embodiment of a generator assembly for use in the electrical generator system of FIG. 1.

FIG. 4 is a perspective view of another embodiment of a generator assembly 18, referred to herein as generator assembly 18-3. Generator assembly 18-3 includes a pair of separated copper plates 50-1, 50-2 forming a housing 52 around a plurality of magnets 54, e.g., magnets 54-1, 54-2, 54-3, . . . 54-n. As such, generator assembly 18-3 is configured as a plurality of copper clad ceramic magnets 54 that are positioned to be exposed to particle flow and/or heat transfer produced by heated gases 14. Alternatively, a plurality of copper disks may be alternatingly interposed between adjacent pairs of the plurality of magnets 54.

FIG. 5 is a general diagrammatic representation of an electrical generator system 60 configured in accordance with another embodiment of the present invention. In this embodiment, conduit 16 includes a muffler 62 connected in fluid communication with source 12, e.g., an internal combustion engine. Housed inside muffler 62 is at least one generator assembly 18. In the embodiment of FIG. 5, three generator assemblies 18 are shown, but those skilled in the art will recognize that the number of generator assemblies by be increased or decreased, as desired. In addition, muffler 62 may be sized to accommodate the desired number of generator assemblies 18, e.g., one or more of generator assembly 18-1, generator assembly 18-2, and/or generator assembly 18-3.

As an ancillary benefit of placing one or more generator assemblies 18 in conduit 16, e.g., muffler 62, the configuration of generator assemblies 18 muffle the sound, e.g., exhaust noise, produced by source 12, e.g., the internal combustion engine.

While this invention has been described with respect to embodiments of the invention, the present invention may be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. An electrical generator system, comprising:
   an internal combustion engine for producing heated ionized combustion gases;

a conduit connected to said internal combustion engine for receiving a flow of said heated ionized combustion gases; and a generator assembly positioned in close proximity to said conduit, said generator assembly including:

a plurality of magnets positioned in a spaced relationship, said plurality of magnets producing a magnetic field; and at least one pair of electrodes positioned inside said conduit adjacent to said plurality of magnets to conduct an electrical current generated in response to said flow of heated ionized combustion gases in said conduit from said magnetic field, wherein said at least one pair of electrodes or a plurality of pairs of electrodes are alternatingly interposed between adjacent pairs of magnets of said plurality of magnets.

2. The electrical generator system of claim 1, wherein said plurality of magnets is positioned in a spaced relationship along a periphery of said conduit.

3. The electrical generator system of claim 1, wherein said at least one pair of electrodes includes a pair of separated copper plates forming a housing around said plurality of magnets.

4. The electrical generator system of claim 1, wherein said generator assembly is configured as a plurality of copper clad ceramic magnets that are positioned to be exposed to at least one of heat and particle flow produced by said heated ionized combustion gases.

5. The electrical generator system of claim 1, wherein said heated ionized combustion gases are exhaust gases produced by said internal combustion engine.

6. The electrical generator system of claim 5, wherein said generator assembly is located in one of a land vehicle, a watercraft and an aircraft.

7. The electrical generator system of claim 5, wherein said conduit includes an exhaust pipe connected in fluid communication with said internal combustion engine, wherein said plurality of magnets are positioned in a spaced relationship around a periphery of said exhaust pipe.

8. The electrical generator system of claim 5, wherein said conduit includes a muffler connected in fluid communication with said internal combustion engine, wherein said generator assembly is housed inside said muffler.

9. The electrical generator system of claim 8, further comprising a plurality of said generator assemblies, said plurality of said generator assemblies being housed inside said muffler.

10. The electrical generator system of claim 8, wherein said at least one pair of electrodes includes a plurality of copper disks alternatingly interposed between adjacent pairs of said plurality of magnets.

11. The electrical generator system of claim 5, further comprising a plurality of said generator assemblies, wherein said plurality of said generator assemblies are arranged inside said conduit in a manner to muffle sound produced by said internal combustion engine.

12. The generator system of claim 1, wherein each of said plurality of magnets has a plurality of faces that are exposed to a particle flow.

13. A generator assembly, comprising:

a tubular housing configured to be positioned in close proximity to a flow of heated ionized combustion gases;

a plurality of magnets positioned in a spaced relationship along said tubular housing, said plurality of magnets producing a magnetic field; and at least one pair of electrodes positioned adjacent said plurality of magnets to conduct an electrical current generated in response to said flow of heated ionized combustion gases and said magnetic field, wherein said at least one pair of electrodes is interposed between an adjacent pair of magnets of said plurality of magnets, wherein said at least one pair of electrodes or plurality of pair of electrodes are alternatingly interposed between adjacent pairs of magnets of said plurality of magnets.

14. The generator assembly of claim 13, wherein said plurality of magnets are positioned in a spaced relationship along a periphery of a conduit.

15. The generator assembly of claim 13, wherein said at least one pair of electrodes includes a pair of separated copper plates forming a housing around said plurality of magnets.

16. The generator assembly of claim 13, wherein said generator assembly is configured as a plurality of copper clad ceramic magnets that are positioned to be exposed to at least one of heat and particle flow produced by said heated ionized combustion gases.

17. The generator assembly of claim 13, wherein said generator assembly is located in one of a land vehicle, a watercraft and an aircraft.

18. The generator assembly of claim 13, wherein each of said plurality of magnets has a plurality of faces that are exposed to a particle flow.

* * * * *